United States Patent [19]

Umeda et al.

[11] Patent Number: 5,467,355
[45] Date of Patent: Nov. 14, 1995

[54] IMAGE FORMING APPARATUS PROVIDED WITH SELF-DIAGNOSIS SYSTEM

[75] Inventors: Yasushi Umeda, Chofu; Yasuo Motegi, Gunma; Tetsuo Tomiyama, Chiba; Hiroyuki Yoshikawa, Tokyo; Yoshiki Shimomura, Yawata, all of Japan

[73] Assignee: Mita Industrial Co., Ltd., Osaka, Japan

[21] Appl. No.: 299,082

[22] Filed: Sep. 1, 1994

Related U.S. Application Data

[63] Continuation of Ser. No. 867,509, Apr. 13, 1992, abandoned.
[51] Int. Cl.$^6$ ................................. G06F 11/00
[52] U.S. Cl. ............... 364/571.04; 395/50; 395/54; 395/911; 364/276.3; 364/268.9; 364/281.9; 364/221.2; 364/285; 364/266.4; 364/265; 364/525
[58] Field of Search ................ 371/29.1, 15.1, 371/16.4, 7, 47.1, 16.2, 17, 9.1, 38.1; 395/50, 54, 575, 916; 364/276.3, 281.9, 285, 221.2, 268.9

[56] References Cited

U.S. PATENT DOCUMENTS

| | | | |
|---|---|---|---|
| 4,878,072 | 10/1989 | Reinten | 364/154 |
| 4,879,577 | 11/1989 | Mabrouk et al. | 355/208 |
| 5,127,005 | 6/1992 | Oda et al. | 371/15.1 |
| 5,138,618 | 8/1992 | Honda et al. | 371/16.4 |
| 5,166,934 | 11/1992 | Tomiyama et al. | 371/16.4 |
| 5,177,621 | 1/1993 | Ohtaki et al. | 358/406 |
| 5,239,547 | 8/1993 | Tomiyama et al. | 371/16.4 |

FOREIGN PATENT DOCUMENTS

| | | |
|---|---|---|
| 476681 | 3/1992 | European Pat. Off. |
| 476680 | 3/1992 | European Pat. Off. |
| 63-255701 | 10/1988 | Japan |
| 63-240601 | 10/1988 | Japan |

OTHER PUBLICATIONS

Translated Abstract for Laid–Open Patent No. 63-240601.
Translated Abstract for Laid–Open Patent No. 63-255701.
Umeda et al, "Model Based Diagnosis Using Qualitative Reasoning", as reprinted in Kimura and Rotstades, editors, *Computer Applications in Production and Engineering*, Cape 1989, Tokyo, Japan, pp. 443–450 (2–5 Oct. 1989).
Benjamin Kuipers, "Qualitative Simulation", *Artificial Intelligence*, 29, pp. 289–338 (1986).

(List continued on next page.)

*Primary Examiner*—Robert W. Beausoliel, Jr.
*Assistant Examiner*—Dieu-Minh Le
*Attorney, Agent, or Firm*—Beveridge, DeGrandi, Weilacher & Young

[57] ABSTRACT

In an image forming machine, an objective model storage device stores parameter data that represent elements of the machine and relationships among such parameters, and parameter membership functions, and fault diagnosis knowledge. A degradation storage device stores a fuzzy qualitative value for a parameter changed by degradation of an element of the machine. Preferably, degradation indicative data are converted into fuzzy qualitative values, and the value of the parameter changed by degradation is represented by a fuzzy qualitative value. The machine includes sensors for sensing functional states thereof, and providing state data representative of such states. The state data sensed by the sensors are converted into fuzzy qualitative values. Then, a fault judgement device determines whether or not a fault exists by comparing the obtained fuzzy qualitative values with the parameter data stored in the objective model storage device. If the fault judgement device determines that a fault exists, a fault diagnosis device performs fault diagnosis by utilizing, as an initial value, the value of the parameter changed by degradation. A specification device specifies fault causes by comparing the result of the diagnosis with the state data which was converted into the fuzzy qualitative values. Then, a repair device operates actuators of the machine to overcome the specified fault.

9 Claims, 11 Drawing Sheets

OTHER PUBLICATIONS

Jeff Shrager, et al, "Issues in the Pragmatics of Qualitative Modeling: Lessons Learned from a Xerographics Project", *Communications of the ACM,* vol. 30, No. 12, pp. 1036–1047 (Dec. 1987).

Nishida, an article made available to the public on Jul. 23, 1990 at a meeting of the Artificial Intelligence Society in Japn; and an English translation of sections 10.2 and 10.3 of the Nishida article.

5,467,355

IMAGE FORMING APPARATUS PROVIDED WITH SELF-DIAGNOSIS SYSTEM

This application is a continuation of application Ser. No. 07/867,509, filed Apr. 13, 1992, which application is entirely incorporated herein by reference, now abandoned.

BACKGROUND OF THE INVENTION

1. Field of the Invention

The present invention relates to a self-diagnosis and/or self-repair system, and more particularly, to a system or self-repair system, and more particularly, to a system capable of making a self-diagnosis of a degraded state, the operating state and the like of an apparatus by utilizing artificial intelligence and knowledge engineering which have been studied extensively in recent years as well as adopting fuzzy inference and making self-repair thereof as required.

2. Description of the Prior Art

In the development field of precision instruments, industrial machines and the like, expert systems utilizing artificial intelligence (so-called AI) techniques have been studied extensively in recent years for the purpose of realizing labor saving in maintenance work and long-term automatic operation. The expert systems a device for a device for making self-diagnose to judge whether or not a fault is caused in an apparatus and making self-repair of the fault caused.

In a fault diagnosis system by the conventional expert system, such limitations have been pointed out that, for example, (A) there is no versatility in knowledge, which makes it impossible to make fault diagnosis on a variety of objects, (B) diagnosis cannot be made on unknown faults, (C) the quantity of knowledge required for fault diagnosis is increased explosively as an object becomes complicated, thus making implementation difficult, and (D) it is difficult to acquire knowledge.

More specifically, in a conventional automatic control system and fault diagnosis system, an actuator corresponding to a sensor is basically made to operate on the basis of an output of the sensor. That is, one type of automatic control and fault diagnosis has been made by a predetermined combination of a sensor and an actuator. Accordingly, a certain sensor basically corresponds to a particular actuator, and the relationship therebetween has been stationary. Therefore, the conventional system has the following disadvantages: (a) The relationship between parameters of the sensor and parameters of the actuator must be clearly expressed numerically. (b) From the reason mentioned in the above item (a), the relationship between parameters of the sensor and parameters of the actuator depends largely on an object. Accordingly, the conventional system is lacking in versatility, that is, cannot be utilized for a variety of objects. (c) The relationships between parameters of respective sensors and between parameters of respective actuators have no relation with control. Accordingly, only simple control based on the relationship between the parameters of the sensors and the parameters of the actuators which correspond to each other can be carried out, and faults which can be coped with are previously restricted and unknown faults cannot be handled. (d) From the reason mentioned in the above item (c), secondary effects exerted on parameters of other actuators which might be caused by the operation of parameters of an arbitrary actuator cannot be forecast.

In the conventional automatic control system and fault diagnosis system, therefore, only fault diagnosis based on sets respectively including independent sensors and actuators and fault repair based on the fault diagnosis have been made in such a manner that forecasting fault A is made on the basis of a set A of a sensor A and an actuator A, forecasting fault B is made on the basis of a set B of a sensor B and an actuator B, and forecasting fault C is made on the basis of a set C of a sensor C and an actuator C.

The applicant of the present application and the like have proposed as a technique associated with the present invention a new system for making self-diagnosis and/or self-repair by adopting an image forming apparatus as an objective machine so as to eliminate the disadvantages of the prior art (see U.S. patent application Ser. Nos. 07/588,191 and 07/588,177).

Qualitative inference used in the above described self-diagnosis and/or self-repair system already proposed is complete as the approach of determining the qualitative transition from a group of equations and the initial state. On the other hand, the qualitative inference has such an inevitable destiny that an ambiguous expression is not admitted as the state representation of an objective system (machine) because inference in the form of a qualitative, that is, symbolic expression is drawn. The qualitative inference is insufficient as the approach of making fault diagnosis and repair by handling information such as "ambiguous information" often seen in the maintenance activity, for example, information "this may be normal or abnormal" as the state of the machine.

Furthermore, when the fault diagnosis utilizing degradation and fault hysteresis information on respective components constituting the machine is synthesized, a fault diagnosis system and/or fault repair system having a higher degree of completion cannot be constructed unless an inference method having logic using any other method of representation added to the qualitative inference already proposed and the approach of handling ambiguous information added thereto is considered.

The inventors of the present application have invented a self-diagnosis and self-repair system having a higher degree of completion by combining the fuzzy theory which is a theory mathematically handling ambiguity with the qualitative inference used in the above described self-diagnosis and/or self-repair system already proposed.

SUMMARY OF THE INVENTION

An object of the present invention is to provide an image forming apparatus having a system capable of developing inference admitting ambiguity from the point of view of maintenance, making self-diagnosis of the state of an apparatus using the inference and making self-repair thereof as required.

The self-diagnosis and self-repair system according to the present invention calculates the amount of degradation relative to the time elapsed after the image forming apparatus starts to be used up to the present time on the basis of degradation data representing the relationship between the time elapsed after the image forming apparatus starts to be used and the amount of degradation. The value of a parameter changed by the amount of degradation calculated is converted into a fuzzy qualitative value using membership functions of the parameter, and is replaced with an expression used on qualitative data. In addition, data sensed by a plurality of sensor means is converted into a fuzzy qualitative value using the membership functions of the parameter, and it is judged on the basis of the fuzzy qualitative value whether or not a fault exists. If it is judged that a fault exists, fault diagnosis is made utilizing as an initial value the value of the parameter changed by the above described amount of degradation. The result of the diagnosis is outputted as an expression having ambiguity.

Furthermore, the causes of the fault are specified by comparing the fuzzy qualitative value obtained by the conversion from the output of the sensor means with the result obtained by the fault diagnosis. More specifically, when a plurality of fault candidates are taken up as a result of the fault diagnosis, a fault candidate which best coincides with the actual state of the apparatus is examined. Consequently, the actual fault state is outputted more accurately. A predetermined one of a plurality of actuators is operated by repair means to repair the fault.

In the self-diagnosis and self-repair system according to the present invention viewed at another angle, the amount of degradation of a component for each predetermined timing of fault diagnosis, for example, for each elapse of one month is estimated, and the change in the value of a parameter based on the estimated amount of degradation is stored by a fuzzy qualitative value. At the predetermined timing of fault diagnosis, data detected by a plurality of sensor means is converted into a fuzzy qualitative value using membership functions of the parameter, and it is judged whether or not a fault exists on the basis of the fuzzy qualitative value. In addition, if it is judged that a fault exists, the fuzzy qualitative value of the parameter at the timing of fault diagnosis is read out, and fault diagnosis is made utilizing the value as an initial value. The result of the diagnosis is outputted by an expression having ambiguity.

Furthermore, the fuzzy qualitative value converted from a detection output of the sensor means is compared with the ID result obtained by the fault diagnosis, to specify the causes of the fault. More specifically, when a plurality of fault cause candidates are taken up as a result of the fault diagnosis, it is examined which fault cause candidate coincides with the actual state of the image forming apparatus more exactly. Consequently, the actual fault state is outputted more exactly. The repair means operates predetermined ones of a plurality of actuators, to repair the fault.

Furthermore, the fuzzy qualitative value converted from a detection output of the sensor means is compared with the result obtained by the fault diagnosis, and the degree to which a fault phenomenon occurs at the timing of fault diagnosis is considered to specify the causes of the fault. More specifically, when a plurality of fault cause candidates are taken up as a result of the fault diagnosis, it is examined which fault cause candidate coincides with the actual state of the image forming apparatus more exactly on the basis of the degree of coincidence of the values of parameters and the degree to which a fault phenomenon occurs. Consequently, the actual fault state is acknowledged and outputted more exactly. The repair means operates predetermined ones of a plurality of actuators, to repair the fault.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Fuzzy qualitative inference

Description is now made of fuzzy qualitative inference which is a newly developed inference having ambiguity required for self-diagnosis.

(1) Fuzzy qualitative value

In qualitative inference used in a self-diagnosis and/or self-repair system according to the prior application of the applicant, the concepts of a quantity space and a qualitative value have been used as the approach of symbolically representing the value of a variable. The quantity space is a finite set obtained by symbolically representing a set of real numbers by a landmark which is a characteristic value having a physical meaning and a section enclosed by the landmark. Accordingly, either one of a boundary value or a section value is only taken as the qualitative value.

Considering a self-diagnosis and/or self-repair system in an ideal objective machine taken as an example, it makes sense to judge whether a certain value is a landmark value or a section value. When a quantitative value obtained by measurements is converted into a qualitative expression and inference is drawn on the basis of the expression in the actual world, it may not be appropriate that the quantitative value obtained by measurements is only alternatively converted into a landmark value or a section value. The reason for this is that "ambiguous information" is seen in the maintenance activity, as described above, so that there can actually occur the situation where the quantitative value may be a landmark value or a section value.

Therefore, the fuzzy theory is applied to the present invention.

The fuzzy theory is a theory of mathematically handling ambiguity. The expression of a set in the fuzzy theory is characterized in that an intermediate state where it is not clear whether or not a certain element belongs to the set is indicated by decimal fractions from 0.0 to 1.0 as the degree to which the element belongs to the set. The intermediate state which cannot be represented by a conventional set can be represented by using this form of expression. In the fuzzy theory, a function for defining the degree to which a certain element belongs to a certain set (grade) is referred to as a "membership function".

An expression having ambiguity added to a qualitative expression becomes possible by introducing the concept of a fuzzy set represented using this membership function. More specifically, in the present invention, the value of a variable is represented as a set of a conventional qualitative value and the degree to which it belongs to the qualitative value (grade). Such a form of expression will be referred to as a "fuzzy qualitative value".

Figure 1:
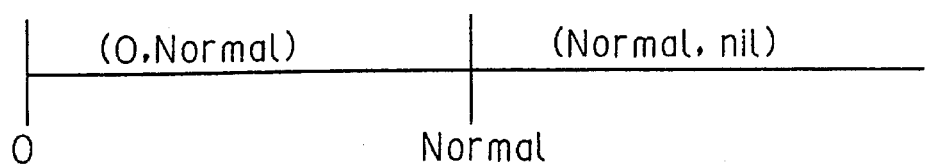
FIG. 1 is a diagram showing one example of a qualitative quantity space.

For example, when the value of a certain variable is represented by a fuzzy qualitative value in a quantity space shown in FIG. 1, the value is expressed, for example, as follows:

(Normal: 0.4, (Normal, nil): 0.6)

It is possible to admit ambiguity by using this method of representation by a fuzzy qualitative value when sensor information is made use of for inference. More specifically, in a fault diagnosis system using the qualitative inference previously proposed, a certain constant range has been determined as a range of normal values. If a quantitative value obtained from a sensor is in the range, it is considered that the qualitative value is on a landmark of "normal values", to draw qualitative inference.

Figure 2:
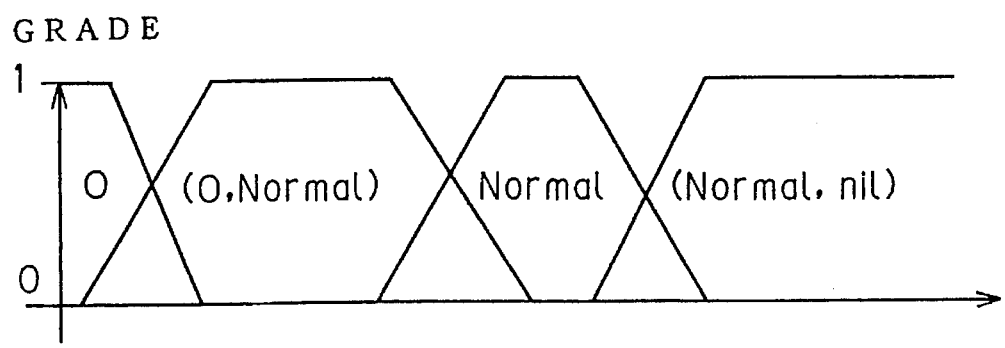
FIG. 2 is a diagram showing one example of membership functions for converting sensor information into a fuzzy qualitative value.

On the other hand, in the present invention, membership functions are used for the operation of converting a quantitative value obtained from a sensor into a qualitative expression. When membership functions are used, membership functions such as "a normal value (Normal; hereinafter abbreviated as N)", "larger than a normal value (Normal, nil; hereinafter abbreviated as N, nil)", and "smaller than a normal value (0, Normal; hereinafter abbreviated as 0, N)" are previously determined on a space of real numbers of the sensor, as shown in FIG. 2. A quantitative value obtained from the sensor is mapped on the space shown in FIG. 2, to convert the quantitative value into a qualitative expression admitting ambiguity.

(2) Operation rule of fuzzy qualitative value

An algebraic operation of a fuzzy qualitative value comprises an algebraic operation rule of qualitative inference and the calculation of grades. Description is made while giving concrete examples. Following is a concrete example:

$Zf = Xf \times Yf$ $Xf = (N: 0.8, (N, nil): 0.2)$ $Yf = ((0, N) 0.7, N: 0.3)$ and the relationship between landmarks is as follows:

$(Xf, Yf, Zf) = (N, N, N)$

All values which can be taken as the qualitative value of Zf are listed from the respective qualitative values of Xf and Yf (in this example, N and (N, nil) of Xf) and the relationship between the landmarks. The smaller one of the grades with respect to the qualitative values of Xf and Yf is adopted as a grade with respect to the qualitative value of Zf at that time. The foregoing will be described more specifically:

| Xf | | Yf | | Zf | |
|---|---|---|---|---|---|
| N | × | (0, N) | = | (0, N) | : 0.8, 0.7 = 0.7 |
| N | × | N | = | N | : 0.8, 0.3 = 0.3 |
| (N, nil) | × | (0, N) | = | (0, N) N (N, nil) | : 0.2, 0.7 = 0.2 |
| (N, nil) | × | N | = | (N, nil) | : 0.2, 0.3 = 0.2 |

Furthermore, when not less than two types of grades are found with respect to the qualitative value of Zf, the maximum value thereof is adopted. In the foregoing example, since two types of grades, that is, 0.7 and 0.2 are found with respect to the qualitative value (0, N) of Zf in the first and third equations, the maximum value thereof, that is, 0.7 is adopted as the grade with respect to the qualitative value (0, n) of Zf. Similarly, since two types of grades, that is, 0.3 and 0.2 are found with respect to the qualitative value N of Zf in the second and third equations, the maximum value thereof, that is, 0.3 is selected.

From the foregoing calculations, the fuzzy qualitative value of Zf is as follows:

$Zf = ((0, N): 0.7, N: 0.3, (N, nil): 0.2)$

Furthermore, standardization is so achieved that the sum of the grades is 1. The standardization is achieved by dividing the grade with respect to each of the qualitative values by 1.2 (where 1.2=0.7+0.3+0.2). As a result of the standardization, the qualitative value of Zf becomes as follows:

$Zf = ((0, N): 0.58, N: 0.25, (N, nil): 0.17)$ (3) Inference

Inference basically uses the propagation method. This propagation method is an algorithm for sequentially propagating the value of a parameter whose value is already determined to the other parameters using the relationship between the parameters to determine parameters in the entire system.

The propagation procedure uses a method of determining an unfixed parameter out of parameters in the binomial relation or the trinomial relation using the parameters already determined and the relationship therebetween from the above described fuzzy operation rule. The specific inference method will be made clear from the concrete examples as described later.

System composition

Figure 3:
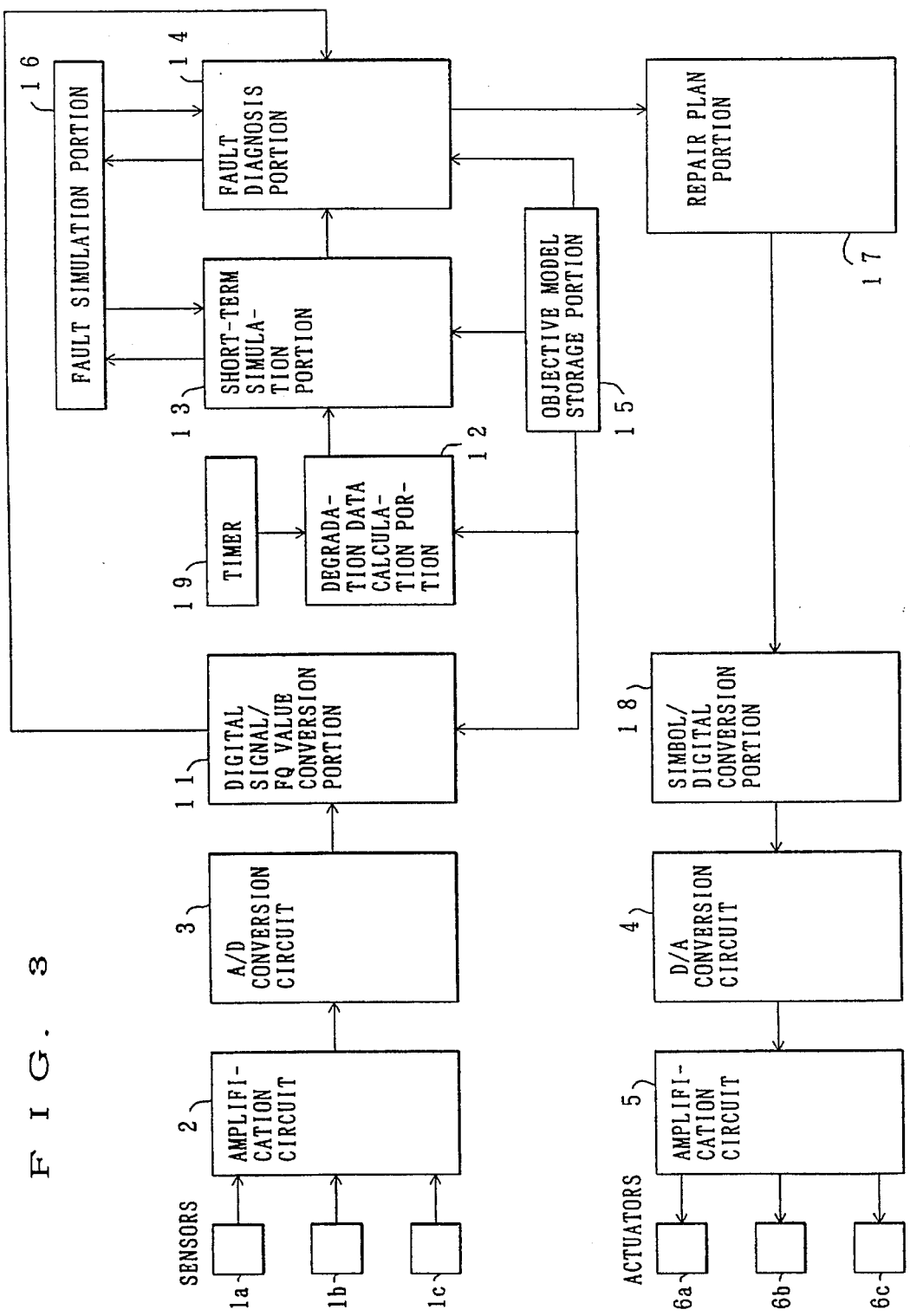
FIG. 3 is a block diagram showing the construction of one embodiment of the present invention.

FIG. 3 is a block diagram showing the construction of a system according to one embodiment of the present invention. This system comprises a plurality of sensors 1a, 1b and 1c installed on an objective machine (more concretely, a small-sized electrophotographic copying machine or the like) and a plurality of actuators 6a, 6b and 6c for changing the operating state or the like of the objective machine.

The plurality of sensors 1a, 1b and 1c are respectively used for sensing the change of elements of the objective machine or relevant states among the machine elements which occur by the operation of the objective machine. Information which are taken in from the plurality of sensors 1a, 1b and 1c, respectively, are amplified by an amplification circuit 2, are converted from analog signals to digital signals by an A/D conversion circuit 3, and are applied to a digital signal/FQ value (fuzzy qualitative value) conversion portion 11. The digital signal/FQ value conversion portion 11 is a portion for converting the digital signal applied from the A/D conversion circuit 3 into a fuzzy qualitative value, that is, has the converting function for representing the digital signal by a qualitative value (any one of four symbols, for example, "nothing (0)", small (0, N)", "normal (N)", and "large (N,nil)") and a grade (a numerical value of 0.0 to 1.0). The signals applied from the sensors 1a, 1b and 1c are respectively converted into qualitative information represented by fuzzy qualitative values, thereby to make it possible to evaluate function of a machine accurately as described later.

Furthermore, there are provided a degradation data calculation portion 12, a timer 19 for applying data on the time elapsed after the objective machine starts to be used to the degradation data calculation portion 12, a short-term simulation portion 13, a fault diagnosis portion 14, an objective model storage portion 15, and a fault simulation portion 16. The degradation data calculation portion 12 is a portion for calculating the amount of degradation with age of each of the components constituting the objective machine. The method of calculation will be described in detail later. The short-term simulation portion 13 is a portion for simulating the present state of the objective machine. The fault diagnosis portion 14 is a portion for performing function evaluation using fuzzy qualitative values applied from the digital signal/FQ conversion portion 11 to specify the fault symptom as well as deriving the causes of the fault from the fault symptom. A processing step (fault diagnosis step) for deriving the causes of the fault from the fault symptom specified in the fault diagnosis portion 14 is carried out on the basis of inference (non-fuzzy inference using no fuzzy inference) in the self-diagnosis and/or self-repair system disclosed in the above described prior specification of the applicant.

The objective model storage portion 15 previously stores a "substance model" in which an objective machine is grasped from a physical point of view and is represented by parameters as a combination of a plurality of elements in a substance level (see Table 2 as described later), a "parameter model" in which the objective machine is represented as a combined tree of the respective parameters (see FIG. 11 as described later), initial values of the respective parameters, membership functions of a function parameter (as shown in FIG. 2), the relationship between the time elapsed after the objective machine starts to be used and the degraded state of a component paid attention to (see FIG. 4 as described later), the relationship between the degraded state and membership functions of a parameter (see FIG. 5 as described later), the relationship between the degraded state and the degree to which a fault phenomenon occurs (see FIG. 6 as described later), a reference value for fault judgment, fault candidate knowledge, and the like. The types of knowledge stored in the objective model storage portion 15 are made use of when the digital signal/FQ value conversion portion 11, the degradation data calculation portion 12, the short-term simulation portion 13, or the fault diagnosis portion 14 performs processing. In addition, the fault simulation portion 16 is a portion for simulating a fault in cooperation with the short-term simulation portion 13 and the fault diagnosis portion 14.

One of the features of the present embodiment and the present invention is that a system is provided with two constituent elements, that is, the degradation data calculation portion 12 and the short-term simulation portion 13. The two constituent elements will be described in more detail.

(1) Degradation data calculation portion

The degradation data calculation portion 12 takes up components associated with fault diagnosis out of the components constituting the objective machine, to calculate the degraded state with time for each component, the effects of the degraded state on the value of a parameter, and the degree to which a fault phenomenon occurs.

Figure 4:
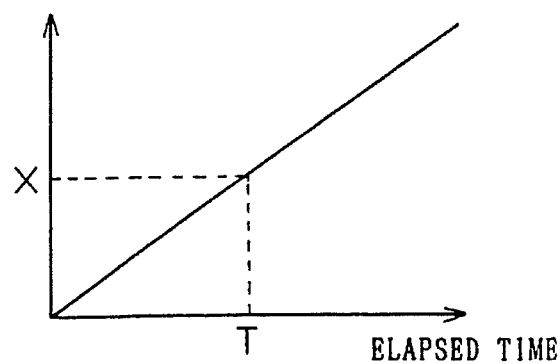
FIG. 4 is a diagram showing the relationship between degradation/factor parameters and the amount of degradation.

Degradation data representing the relationship between the time T elapsed after the objective machine starts to be used and the amount of degradation X is previously set for each component associated with fault diagnosis or a group of relevant components. For example, data as shown in FIG. 4 is set. This degradation data is stored in the objective model storage portion 15. The degradation data calculation portion 12, for example, adds up time data applied from the timer 19 to find the total time elapsed after the machine starts to be used up to the present time and applies the time to FIG. 4, thereby to calculate the degraded state of a component paid attention to.

Meanwhile, the degraded state calculated in this case is not for estimating the physical quantities on the parameter model of the objective machine on the basis of frequency of fault or the like. For example, it is assumed that the component paid attention to is a particular gear. Even if the degraded state of the gear (the amount of wear of the gear) is found, it is not found how change occurs on the parameter model of the objective machine.

Figure 5:
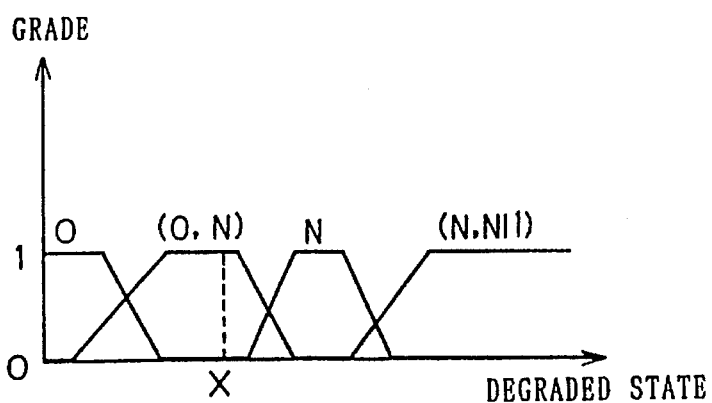
FIG. 5 is a diagram showing one example of a quantity space of the degradation factor parameter.

The effects of the degradation on the objective machine are then found from the relationship between the degraded state and the value of the parameter on the parameter model as shown in FIG. 5. The relationship between the degraded state and the value of the parameter as shown in FIG. 5 is previously set using the membership functions of the parameter and is stored in the objective model storage portion 15. The degradation data calculation portion 12 reads out the graph of the membership functions of the parameter against the degraded state as shown in FIG. 5 from the objective model storage portion 15 and maps the degraded state on this graph, thereby to calculate the effects of the degradation on the value of the parameter.

Figure 6:
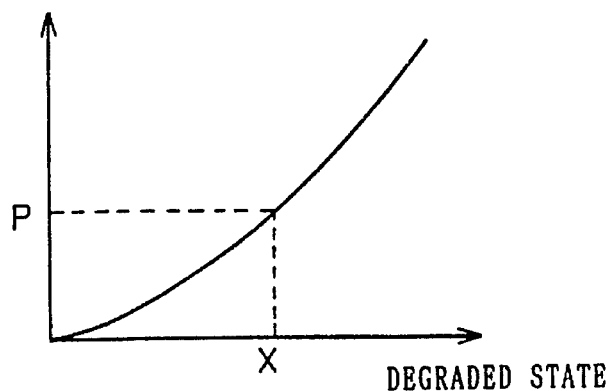
FIG. 6 is a diagram showing the relationship between the degree to which a fault phenomenon occurs with respect to the degraded state.

Furthermore, the degradation data calculation portion 12 determines the degree to which a fault phenomenon occurs with respect to the degraded state calculated from the graph of the degree P to which a fault phenomenon occurs against the degraded X state as shown in FIG. 6 which is previously stored in the objective model storage portion 15.

Meanwhile, the degraded state calculated on the basis of FIG. 4 is a value determined, if the time elapsed after the objective machine starts to be used is determined, corresponding to the time and is calculated as a quantitative value. On the other hand, the value of the parameter obtained on the basis of FIG. 5 is a value having ambiguity which is represented by a fuzzy qualitative value and is expressed, for example, as follows from a qualitative value and a grade:

((0, N): 0.9, N: 0.1)

Furthermore, the degree to which a fault phenomenon occurs which is calculated on the basis of FIG. 6 is a quantitative value determined depending on the degraded state.

In place of the above described construction, a fuzzy qualitative value of a parameter and the degree to which a fault phenomenon occurs (see Table 1 as described later) which are changed depending on the amount of degradation for each predetermined timing of fault diagnosis may be stored in the objective model storage portion 15 to calculate the change with age of the objective machine by the degradation data calculation portion 12.

More specifically, a fuzzy qualitative value of a parameter and the degree to which a fault phenomenon occurs for each timing of fault diagnosis may be estimated and set for each component associated with the fault diagnosis or for each group of relevant components. For example, a degradation data shown in Table 1 is set. This degradation data is stored in the objective model storage portion 15. The degradation data calculation portion 12, for example, adds up time data applied from the timer 19 to find the time elapsed after the objective machine starts to be used up to the present time and applies the time to the table 1, thereby to calculate degradation data (a fuzzy qualitative value of a parameter and the degree to which a fault phenomenon occurs) of a component paid attention to.

TABLE 1

| elapsed time | FQ value of parameter Z | degree to which phenomenon occurs |
|---|---|---|
| T1 | Z1 = (N : X1) | P1 |
| T2 | Z2 = ((0,N) : X2, N : Y2) | P2 |
| : | : | : |
| : | : | : |
| Tn | Zn = ((0,N) : Xn,N : Yn) | Pn |
| : | : | : |
| : | : | : |
| : | : | : |

(2) Short-term simulation portion

A short-term simulation (hereinafter referred to as SSIM) is a simulation for determining the state of the present objective machine.

The state of the objective machine is represented by a set of physical quantities indicating attributes of the respective components constituting the objective machine. The SSIM is made on the parameter model in which the physical quantities are related to each other by a qualitative equation. The SSIM inference method uses the above described fuzzy qualitative inference. In addition, the propagation method is used as an algorithm for the fuzzy qualitative inference. Description is now made of this propagation method.

Inference begins in a state where the respective values of constant parameters, parameters determined by values obtained from the sensors, and parameters determined by the degradation data calculation portion 12 are determined.

In the case of the propagation, the following procedure is carried out:

(1) If two parameters have been already determined out of parameters in the trinomial relation (+, −, x and the like), the remaining one parameter is determined.

(2) If either one of parameters in the binomial relation (=) is determined, the other parameter is determined.

The foregoing propagation procedure is repeated until the values of all the parameters are determined.

As a result, the state of the entire objective machine, that is, the values of all the parameters are determined by the SSIM.

Figure 7:
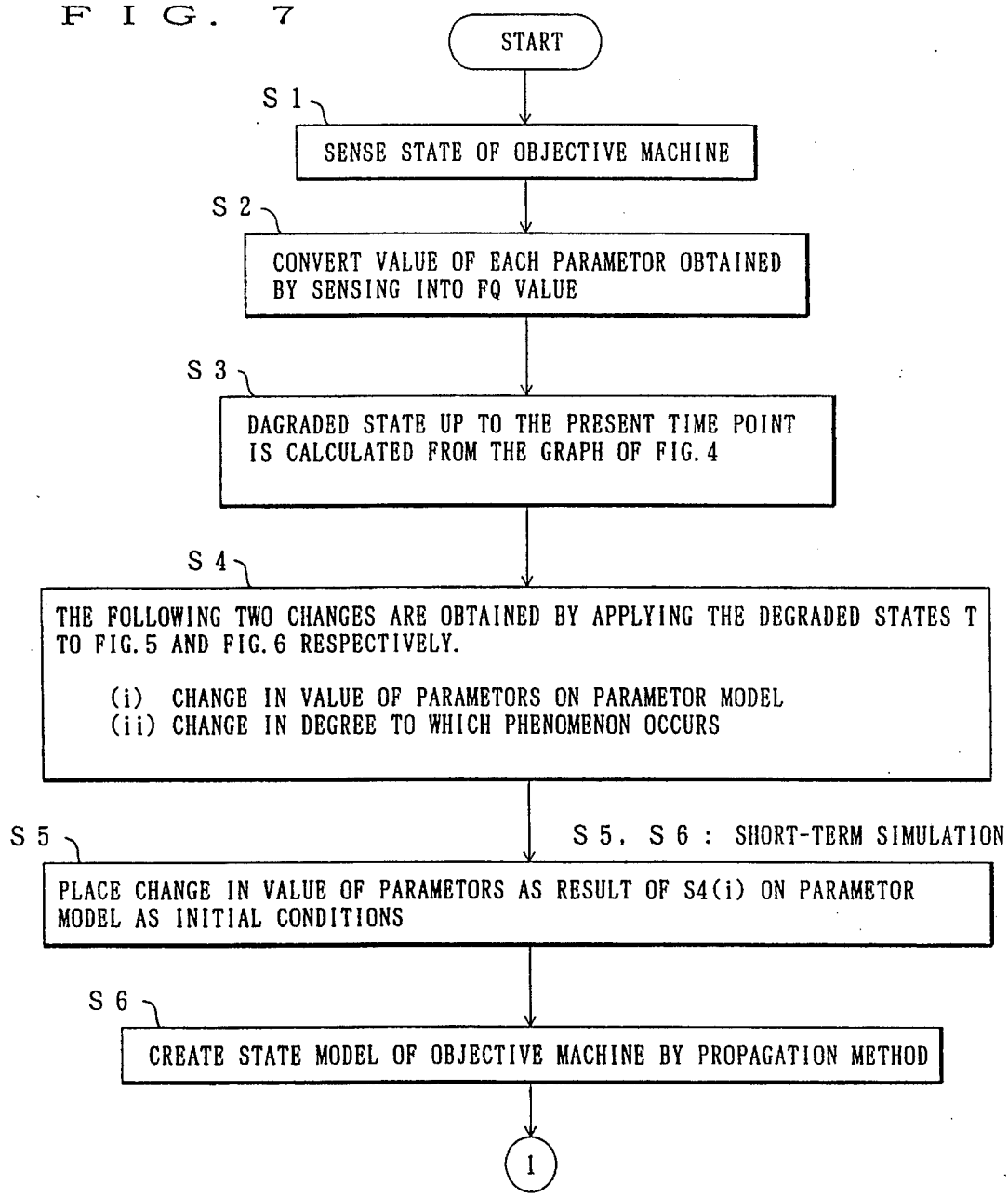
FIG. 7 is a part of a flow chart showing the inference procedure for fault diagnosis in the present embodiment.
Figure 8:
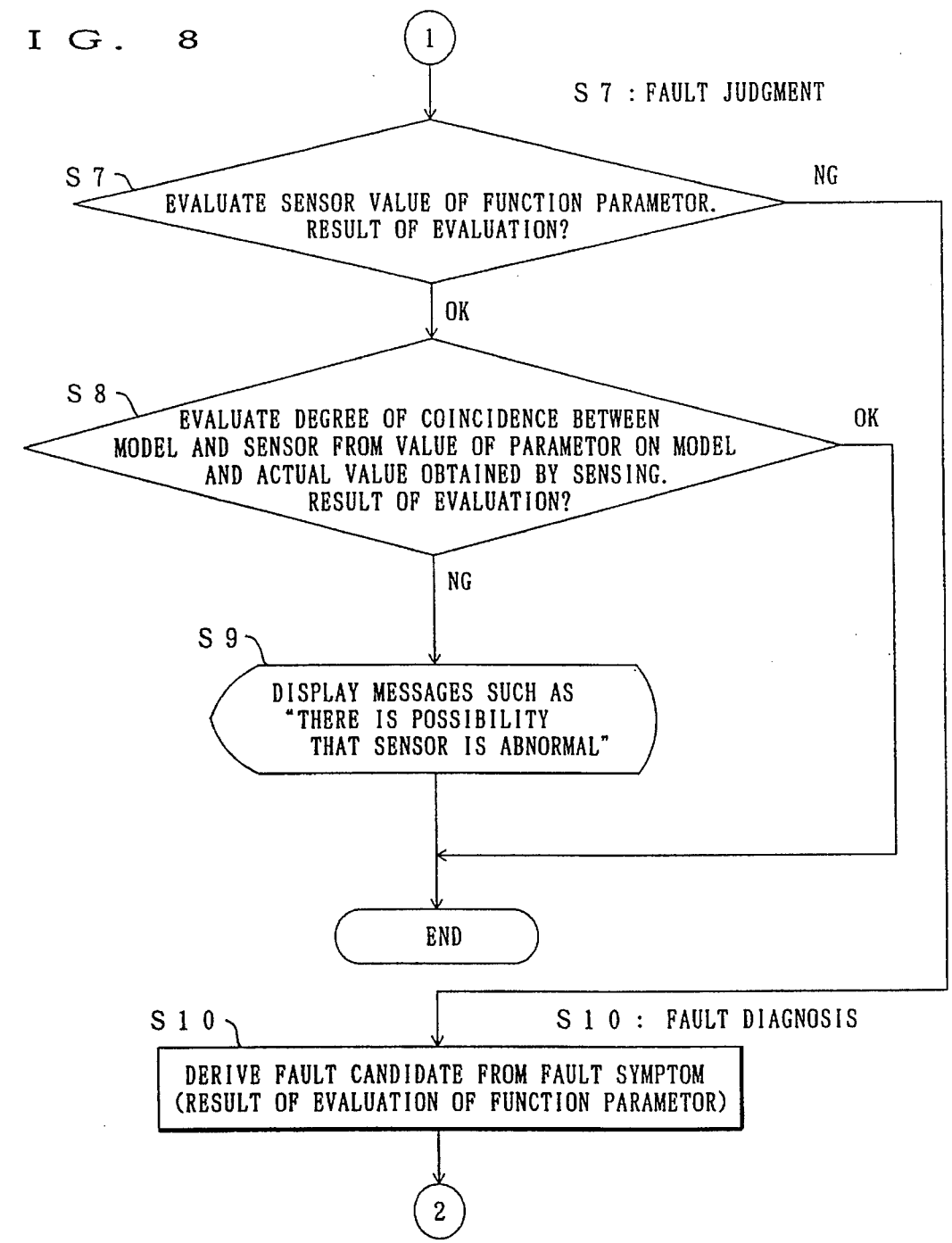
FIG. 8 is a part of a flow chart showing the inference procedure for fault diagnosis in the present embodiment.
Figure 9:
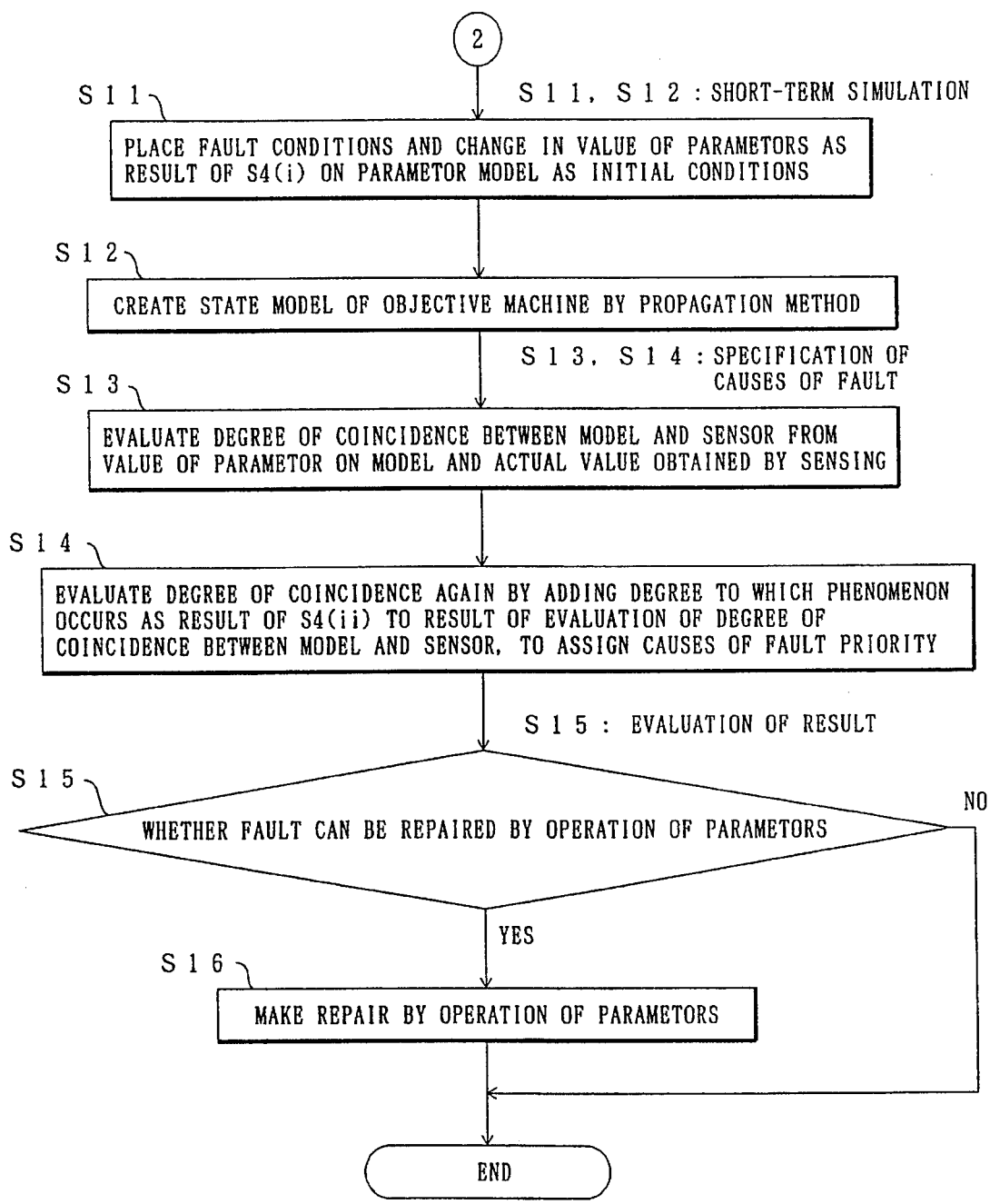
FIG. 9 is a part of a flow chart showing the inference procedure for fault diagnosis in the present embodiment.

Description is now made of the inference procedure for fault diagnosis which is made in the degradation data calculation portion 12, the short-term simulation portion 13, the fault diagnosis portion 14, and the fault simulation portion 16.
Fault diagnosis in fuzzy qualitative inference utilizing degradation information Inference for fault diagnosis is drawn in the following procedure with reference to FIGS. 7, 8 and 9.

The state of the objective machine at the time point is previously sensed by the sensors 1a, 1b and 1c provided for the objective machine (step S1), and the value of each of parameters obtained by the sensing is converted into a fuzzy qualitative value (step S2). The sensing of the value of the parameter in the step S1 is achieved by, if there is provided a sensor, the sensor (for example, the quantity of light H1 of a halogen lamp is measured by an AE sensor, as described later). If there is provided no sensor, however, the sensing may be achieved by using a method in which a service man or the like manually measures the objective machine and inputs a value obtained by the measurement into a system. In addition, the conversion of the value of the parameter into a fuzzy qualitative value in the step S2 is achieved by mapping a quantitative value obtained by the measurement on membership functions of each of the parameters previously stored in the objective model storage portion 15 (as shown in FIG. 2).

(1) Calculation of degraded state

The degraded state up to the present time point is then calculated (step S3). The degraded state is found by adding up time data applied from the timer 19 in the degradation data calculation portion 12 and applying a value obtained by the addition to the graph shown in FIG. 4 which is read out of the objective model storage portion 15, as described above. Meanwhile, the timer 19 itself may be one of such a time adding type that its output value can be directly utilized, or a service man or the like may manually input the time elapsed after the objective machine starts to be used without providing the timer 19.

(2) Conversion of degraded state into effects on objective model

The degraded state obtained from the graph shown in FIG. 4 is converted into the effects exerted on the parameters on the objective model (step S4).

The conversion comprises the following types of processing:

(i) processing for obtaining the change in the value of the parameter oil the parameter model by applying the degraded state calculated in the step S3 to the graph shown in FIG. S, and (ii) processing for obtaining the change in the degree to which a phenomenon occurs by applying the degraded state to the graph shown in FIG. 6.

Although description was made of a case where the above described two changes are found as the effects of the degradation on the objective model, only (i) the change in the value of the parameter on the parameter model, for example, may be found.

Description is now made of procedure of calculation of degraded state using the table 1 .

(1+2) Calculation of degraded state (using the table 1)

When the above described table 1 is used, the calculation of the degraded state is performed as follows: The calculation of the degraded state is performed by adding up time data applied from the timer 19 in the degradation data calculation portion 12 and applying a value obtained by the addition, when it reaches predetermined elapsed time T1, T2, . . . , to the table 1, to read out the value of the parameter and the degree to which a phenomenon occurs corresponding to the time T1, T2, . . . . Meanwhile, the timer 19 itself may be one of such a time adding type that its output value can be directly utilized, or a service man or the like may manually input the time elapsed after the objective machine starts to be used without providing the timer 19.

The above described table 1 may be replaced with a simplified table showing only a fuzzy qualitative value of a parameter. In addition, only the fuzzy qualitative value of the parameter may be calculated as the degraded state.

(3) SSIM

The simulation is made utilizing as the initial conditions the change in value of parameters obtained as the effect exerted on-the component found in the foregoing item (2), to determine the values of parameters in the entire objective machine after an elapse of time.

More specifically, the value of a predetermined parameter obtained by the step S4 is placed on the parameter model (step S5), and is propagated to the other parameters on the parameter model by the propagation method so that the values of all the parameters in the objective machine are determined, to create a state model of the objective machine (step S6).

(4) Fault judgment

It is then judged by viewing the sensor value of a function parameter out of the sensor values previously converted into fuzzy qualitative values in the step S2 whether or not a fault occurs (step S7).

The sensor value of the function parameter is evaluated by comparison with a reference value for fault judgment previously stored in the objective model storage portion 15. If it is judged that the sensor value of the function parameter is normal, the program proceeds to the step S8. In the step S8, the value of the parameter on the parameter model found in the step S6 and the fuzzy qualitative value which converted in the step S2 are compared with each other, to determine the degree of coincidence between the parameter model and the actual state of the objective machine.

As a result of the evaluation of the degree of coincidence in the step S8, processing is terminated when both coincides with each other, while the objective machine continues to be operated by giving precedence to the judgment in the step S7 that the sensor value of the function parameter is normal. However, the value on the model and the sensor value does not coincide with each other so that there is a possibility that a fault occurs. Accordingly, a display device or the like is caused to display a message (step S9). The message is displayed in various forms. For example, when the sensor value of the function parameter is normal and the value on the parameter model and the sensor value does not coincide with each other, it is considered that the sensor lot measuring the function parameter fails, so that a message such as "there is a possibility that the sensor is abnormal" is displayed.

(5) Fault diagnosis

When it is judged in the above described item (4) that a fault occurs, a fault candidate is derived from the fault symptom (step S10).

A plurality of fault candidates are previously stored in the objective model storage portion 15 (see FIG. 3). The value of the function parameter is traced on the parameter model, to select and derive the corresponding fault candidate from the plurality of fault candidates previously stored. Alternatively, the fault candidate may be determined by inference (non-fuzzy inference using no fuzzy theory) described in the above described prior application of the applicant.

(6) SSIM

The SSIM is made with respect to each of the fault candidates derived in the step S10, to create a fault model.

More specifically, the fault conditions and the value of the parameter obtained as a result of the calculation of degraded state and the conversion into the effect exerted on the model are placed as initial conditions on the parameter model with respect to each of the fault candidates (step S11), and the value of the parameter is traced on the parameter model by the propagation method, to create a state model of the objective machine (step S12).

In the above described manner, a fault model is created.

(7) Specification of causes of fault

The causes of the fault are assigned priority and are narrowed down from sensor information, the degree to which a phenomenon occurs found in the item (2) (ii), and the like.

More specifically, the degree of coincidence between the model and the sensor is evaluated on the basis of the value of the parameter on the state model and fuzzy qualitative value converted in the step S2 (step S13), and the degree of coincidence is evaluated again by adding the degree to which a phenomenon occurs to the result of the evaluation of the degree of coincidence, to assign the causes of the fault priority (step S14).

Meanwhile, a simple method of specifying the causes of the fault by only the degree of coincidence between the value of the parameter on the model and the actual sensor value of the parameter which is evaluated in the step S13 by omitting the processing in the step S14 may be used.

The fault diagnosis is completed in the foregoing inference procedure. In addition, at the time of the completion of the fault diagnosis, the work of adding and/or repairing fault hysteresis information may be performed. Thereafter, it is judged by the operation of parameters whether or not the fault can be repaired (step S15). The fault is repaired when it can be repaired by the operation of parameters (step S16), while the processing is terminated without any modification because the fault cannot be repaired when it cannot be repaired by the operation of parameters, for example, when a halogen lamp is cut off in an electrophotographic copying machine. The repair operation in the step S16 is performed in a repair plan portion 17 as described below.

Returning to FIG. 3, the remaining composition blocks will be described.

The repair plan portion 17 is a composition portion for inferring a repair plan for repairing, when a fault exists, the fault as well as deriving repair work. The inference of the repair plan and the derivation of the repair work make use of non-fuzzy qualitative inference using no fuzzy theory, similarly to the inference in the self-diagnosis and/or self-repair system already proposed.

The repair work outputted from the repair plan portion 17 is converted into a digital signal in a symbol-to-digital signal conversion portion 18. The digital signal converted is converted into an analog signal in a D/A conversion circuit 4, is amplified in an amplification circuit 5, and is applied to a plurality of actuators 6a, 6b and 6c so that the actuators 6a, 6b and 6c are selectively operated, thereby to perform the repair work.

Description by taking as example specific objective machine

Construction and state of specific objective machine

Description is now made by taking as an example a case where this system is applied to an image forming apparatus serving as a specific objective machine and more specifically, to a small-sized electrophotographic copying machine.

Figure 10:
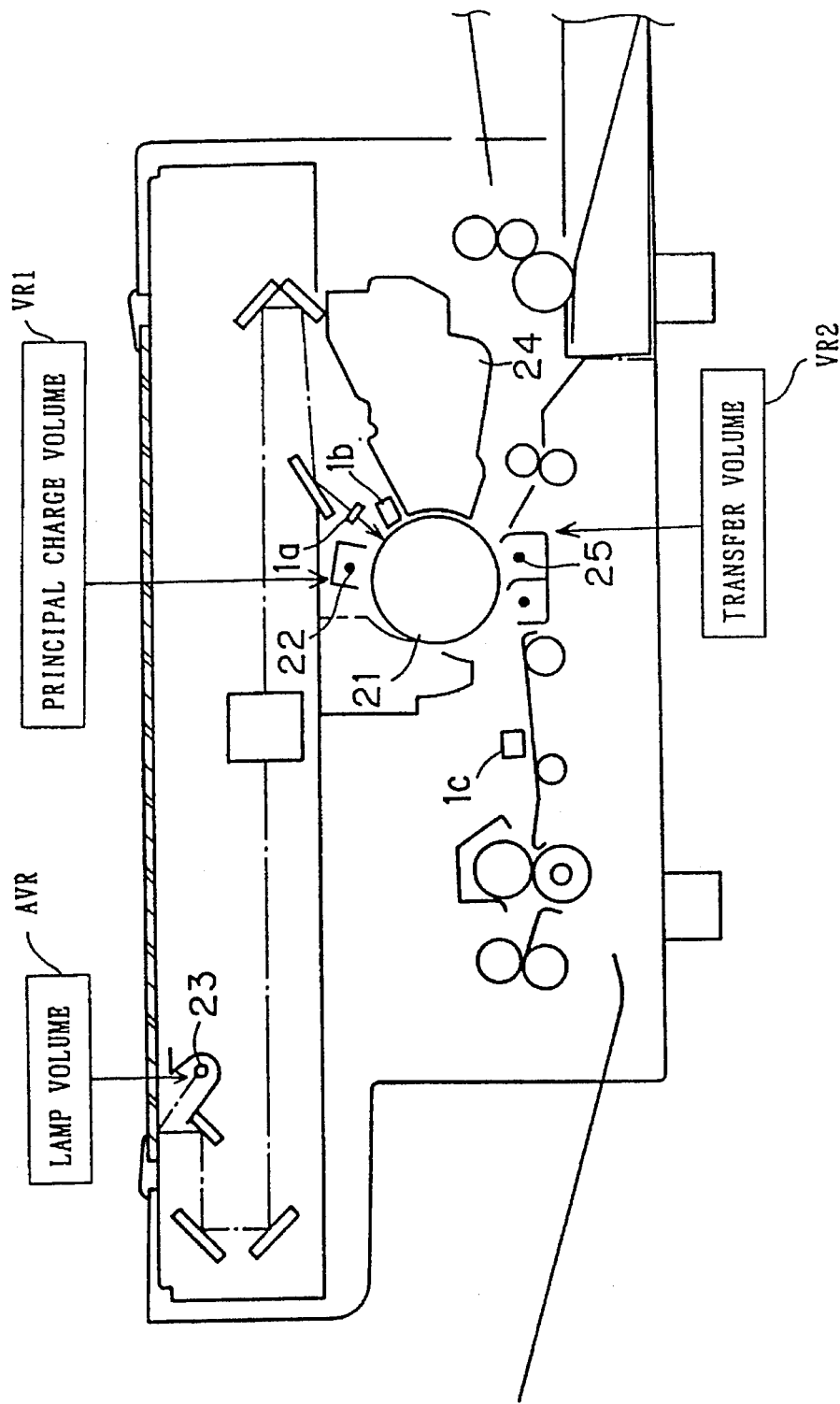
FIG. 10 is an illustration showing a small-sized electrophotographic copying machine serving as a specific objective machine.

FIG. 10 is an illustration showing a small-sized electrophotographic copying machine serving as a specific objective machine. In FIG. 10, reference numeral 21 designates a photosensitive drum, reference numeral 22 designates a principal electro static charger, reference numeral 23 designates a halogen lamp for copy illumination, reference numeral 24 designates a developing device, and reference numeral 25 designates a transfer charger.

This specific objective machine is provided with, for example, three sensors 1a, 1b and 1c. More specifically, the sensor 1a is an AE sensor for measuring the quantity of light incident on the photosensitive drum 21, the sensor 1b is a surface potential sensor for measuring a surface potential of the photosensitive drum 21, and the sensor 1c is a densitometer for measuring the density of a picture image copied on paper.

Furthermore, three types of actuators are provided. That is, three volumes, that is, a principal charge volume VR1 for changing a principal charge voltage of the photosensitive drum 21, a lamp volume AVR for controlling the quantity of light of the halogen lamp 23, and a transfer volume VR2 for controlling a transfer voltage between the photosensitive drum 21 and copy paper are provided as the actuators.

Meanwhile, when the electrophotographic copying machine shown in FIG. 10 is looked at from a physical point of view, the electrophotographic copying machine is expressed as a combination of a plurality of elements at a substance level, and behaviors and attributes of the respective elements as well as the combinational relationship among the respective elements are expressed qualitatively using parameters, as shown in Table 2. The form of expression will be referred to as a "substance model".

TABLE 2

Substance Model

Exposure portion: $X = H1 - D$
X : logarithm of original reflected quantity of light
H1 : logarithm of halogen lamp output quantity of light
D : optical density of copy
Photosensitive portion: $Vs = Vn - \beta X$
Vs : surface potential after exposure
Vn : surface potential after principal charge
$\beta$ b : sensitivity of photosensitive substance
Development portion: $Ds = \gamma c (Vs - Vb)$
Ds : toner density on drum
$\gamma$ 0 : toner density
Vb : bias voltage
Output portion : $Os = \zeta f \cdot Vt \cdot Ds$
Os : toner density on output paper
$\zeta$ : sensitivity of paper
Vt : transfer voltage
Separation portion: $Sp = (Vt - Asp) \cdot (Vs - Asp)$
Sp : adsorbing force between drum and paper
Asp : amplitude of separating AC voltage Furthermore, the expression of FIG. 11 in which the substance model is abstracted and shown as a combined tree of the parameters will be referred to as a "parameter model".

The "substance model" and the "parameter model" are referred to as an "objective model" collectively. The "objective model" is qualitative data common to image forming apparatuses which is also made use of for fault repair as described later. The respective contents of the substance model and the parameter model are stored in the objective model storage portion 15 (see FIG. 3).

Figure 11:
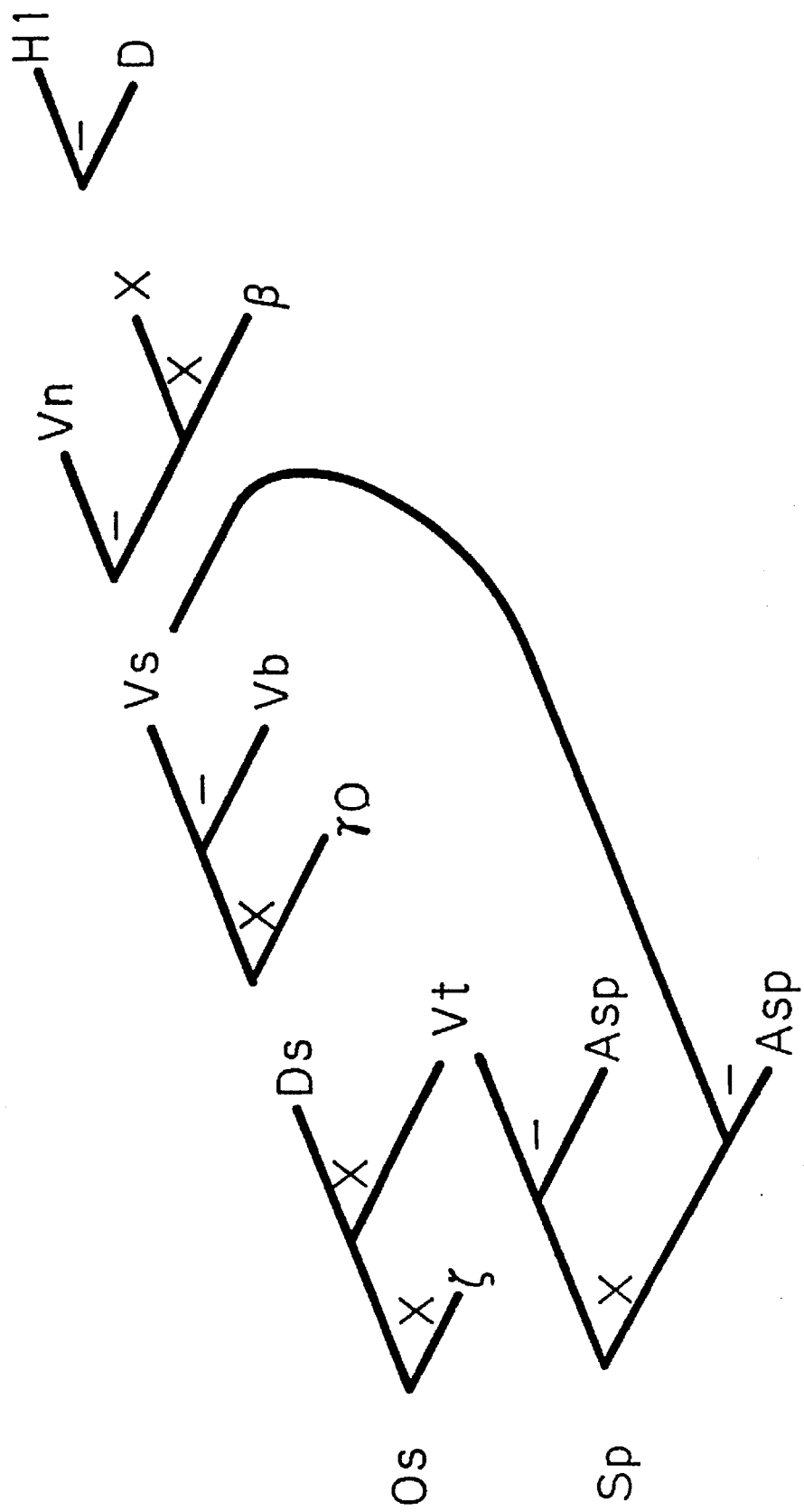
FIG. 11 is a diagram showing a parameter model of the electrophotograpic copying machine according to the present embodiment.
Figure 12:
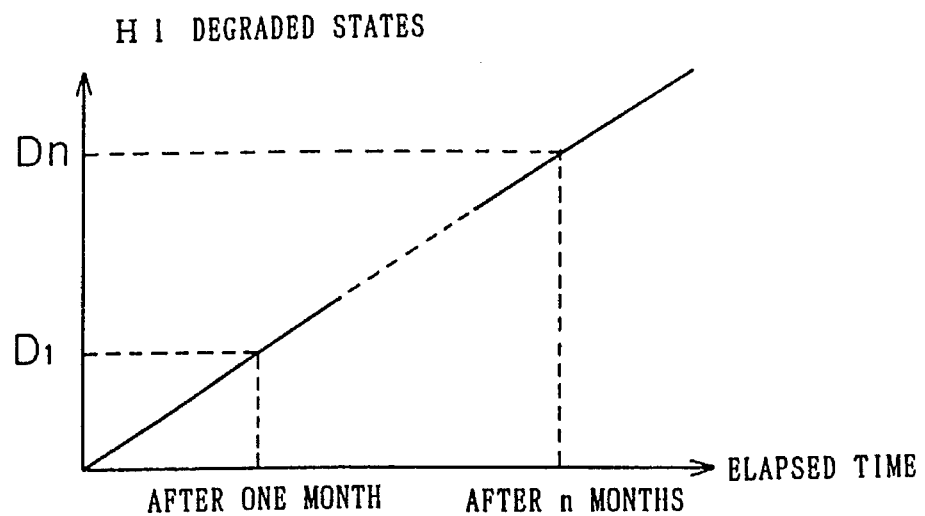
FIG. 12 is a diagram showing an example of a qualitative fuzzy quantity space of a parameter.

In the substance model shown in the table 2 or the parameter model shogun in FIG. 11, the relationship between the time elapsed after the objective machine starts to be used and the degraded state is previously set with respect to each of parameters D1, D, Vn, $\beta$, Vb, $\gamma$O, $\zeta$ and AsP basic to the construction of the objective machine, sensor parameters X, Vs and Os obtained from the sensors, and parameters which may be degraded, and is stored in the objective model storage portion 15. This relationship is a relationship as shown in FIG. 12 in the case of, for example, the parameter H1. When data on the time elapsed after the objective machine starts to be used, for example, data one month after the objective machine starts to be used, data two months after the objective machine starts to be used, . . . are applied from the relationship shown in FIG. 12, degraded states D1, D2, . . . of the parameter H1 are determined corresponding to the data.

Figure 13:
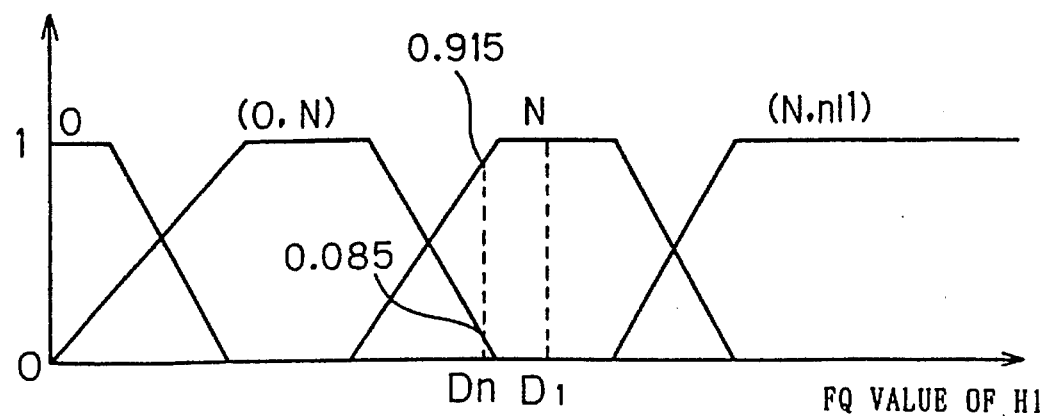
FIG. 13 is a diagram showing one example of a degradation model.

Furthermore, each of the parameters has a qualitative fuzzy quantity space as shown in FIG. 13. This qualitative fuzzy quantity space is created in accordance with membership functions determined for each parameter and is stored in the objective model storage portion 15. From the qualitative fuzzy quantity space shown in FIG. 13, it is possible to find the change in the value of the parameter H1 corresponding to the degraded state thereof. For example, the value of the parameter is (N: 1.0) when the degraded state is D1, while being ((0, N): 0.085, N: 0.915) when the degraded state is Dn.

Figure 14:
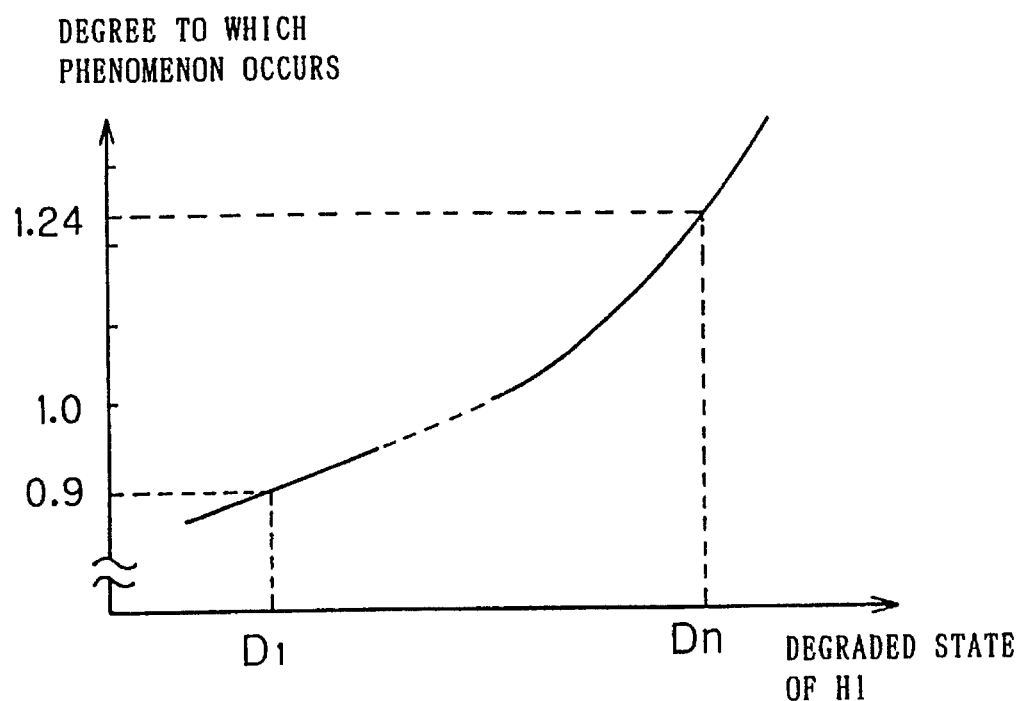
FIG. 14 is a diagram showing a qualitative fuzzy quantity space of each parameters on the degradation model.

Additionally, the relationship between the degraded state and the degree to which a fault phenomenon occurs is previously set for each parameter and is stored in the objective model storage portion 15. This relationship is a relationship as shown in FIG. 14 when the parameter H1 is taken as an example. As can be seen from FIG. 14, the degree to which a fault phenomenon occurs is 0.9 when the degraded state is D1, while being 1.24 when the degraded state is Dn.

In the substance model shown in the table 2 or the parameter model shown in FIG. 11, the relationship between the time elapsed after the objective machine starts to be used and the degraded state may be estimated and set with respect to each of parameters H1, D, Vn, $\beta$, Vb, $\gamma$O, $\zeta$ and Asp basic to the construction of the objective machine, sensor parameters X, Vs and Os obtained from the sensors, and parameters which may be degraded, and is stored in the objective model storage portion 15. In this case, this relationship is a relationship as shown in Table 3 with respect to, for example, the parameter H1.

TABLE 3

| elapsed time | FQ value of H1 | degree to which phenomenon occurs |
| --- | --- | --- |
| after one month | N : 1.0 | 0.9 |
| after two months | (0, N) : 0.05<br>N : 0.95 | 0.92 |
| after three months | (0, N) : 0.07<br>N : 0.93 | 0.93 |
| : | : | : |
| : | : | : |
| after n months | (0, N) : 0.085<br>N : 0.915 | 1.24 |
| : | : | : |
| : | : | : |

From the relationship shown in the table 3, it is possible to immediately find the fuzzy qualitative value of the parameter H1 and the degree to which a fault phenomenon occurs (more specifically, the degree in the present embodiment is the degree to which there occurs a phenomenon that a halogen lamp is cut off) after an elapse of time, for example, after one month, after two months, . . . .

Description is now made by giving several examples utilizing the foregoing description as a premise.

EXAMPLE 1

Example in which machine is normal one month (T1) after it is new

The values obtained by the above described sensors 1a, 1b and 1c are previously converted into fuzzy qualitative values.

More specifically, the quantity of light measured using the sensor 1a is used as the value of a parameter X. In addition, a surface potential Vs after exposure and a toner density Os on output paper are respectively measured by the sensor 1b and the sensor 1c. The values of the parameters obtained by the measurement are respectively mapped on the qualitative fuzzy quantity space as shown in FIG. 13 which is set for each parameter, to obtain, for example, the following sensor values of the parameters:

X=((0, N): 0.1, N: 0.9)

Vs=(N: 1.0)

Os=((0, N): 0.1, N: 0.9)

(1) Forecast of present degraded state

Time information applied from the timer 19 are added up, to find the time T elapsed after the objective machine starts to be used. The time T is applied to the graph of the degraded state against the time elapsed after the objective machine starts to be used for each parameter as shown in FIG. 12, to estimate the present degraded state. As a result, the value of the parameter is found as an estimated value. The value of the parameter H1 is D1 because one month has elapsed since the objective machine started to be used (T=T1).

(2) Examination of effects of degradation

The value of the parameter H1 found in the foregoing item (1) is applied to FIG. 13, to obtain the following result:

H1=(N: 1.0)

Furthermore, the above described value of the parameter H1 is applied to FIG. 14, to obtain data, in which the degree to which there occurs a phenomenon that a halogen lamp (H1Cut) is cut off is 0.9, that is, to obtain the following result:

p (H1Cut)=0.9

When the table 3 is used, the results are as follows: Time information applied from the timer 19 are added up, thereby to find the elapsed time T=T1 of the objective machine. The elapsed time T1 is applied to the table 3, to obtain the following results:

H1= (N: 1.0) p1 (H1Cut)=0.9

(3) Inference of present state of entire machine using result of above item (2) by SSIM The SSIM is made on the basis of the result of the foregoing item (2) (H1=(N: 1.0)) and the initial conditions (in this case, the amount of degradation is not calculated with respect to parameters other than H1 and thus, the remaining parameters are all (N: 1.0)). As a result of the SSIM, the values of all the parameters are (N: 1.0) as described below:

|                |                |
| -------------- | -------------- |
| H1 = (N : 1.0) | γ0 = (N : 1.0) |
| D = (N : 1.0)  | Vt = (N : 1.0) |
| β = (N : 1.0)  | ζ = (N : 1.0)  |
| Vn = (N : 1.0) | Asp = (N : 1.0)|
| Vb = (N : 1.0) |                |

(4) Fault judgment

The following knowledge is used as the reference for fault judgment. This knowledge is previously stored in the objective model storage portion 15 (see FIG. 3).

(a) Fault evaluation of machine

N value≧0.5

→normal

→compare the degree of coincidence between the value on the model and the measured value N value>0.5

→abnormal

→fault diagnosis (b) Comparison between value on model and measured value the degree of coincidence between the value on the model and the measured value≧0.5

→no fault the degree of coincidence between the value on the model and the measured value>0.5

→display message such as "there is a possibility that the sensor is abnormal"

In the present embodiment, (a) the function evaluation of the machine is first carried out. In this case, comparison may be made with respect to Os. Accordingly, comparison is made using Os=((0, N): 0.1, N: 0.9) obtained by converting the measured value of Os into a fuzzy qualitative value. In this case, the value of N is 0.9. Accordingly, N ≧0.5, so that the result of (a) the function evaluation becomes normal.

Then, (b) comparison is made between the value on the model and the measured value.

Comparison is made between each of the sensor values and the value on the model obtained as the result of the above described item (3), to find the degree of coincidence therebetween from the following conditions: degree of coincidence=max (min (grade of each item)) Consequently, the following results are obtained:

|           | sensor value | model value | min value |
| --------- | ------------ | ----------- | --------- |
| x : (0, N)| 0.1          |             | 0         |
| N         | 0.9          | 1.0         | 0.9       |
|           |              |             | max 0.9   |
| Vs : N    | 1.0          | 1.0         | 1.0       |
|           |              |             | max 1.0   |
| Os : (0, N)| 0.1         | 0           | 0         |
| N         | 0.9          | 1.0         | 0.9       |
|           |              |             | max 0.9   |

Furthermore, the degree of coincidence in the entire machine is as follows:

the degree of coincidence in the entire machine

=the average of the degrees of coincidence between the values of the respective sensors and the value on the model

=(0.9+1.0+0.9)/3=0.93

Meanwhile, the degree of coincidence in the entire machine may be found under more strict conditions by taking not the average value but the minimum value of the degrees of coincidence between the values of the respective sensors and the value on the model.

When the above described reference for fault judgment (b) is applied, the average of the degrees of coincidence exceeds 0.5, so that it is judged that the result is normal. More specifically, the results of both (a) and (b) are normal, so that the objective machine can continue to be used. In the above described embodiment, when the result of (a) the function evaluation of the machine is normal and the result of (b) the comparison between the value on the model and the measured value is abnormal (a case where the program proceeds from the step S8 to the step S9 in FIG. 8), there is a possibility that the sensor for measuring the parameter relating to the function evaluation, that is, Os is abnormal, so that a message "there is a possibility that the sensor is abnormal" is displayed.

EXAMPLE 2

Example in which machine fails one month (T1) after it is new, similarly to Example 1

The values of the sensor parameters X, Vs and Os are as follows:

X=(0: 0.9, (0, N): 0.1)

Vs=(N: 0.1, (N, nil): 0.9)

Os=(N: 0.1, (N, nil): 0.9)

Furthermore, when (2) the effect of the amount of degradation is examined after (1) forecast of present degraded state, the following results are obtained as the values of the parameters:

H1=(N: 1.0)

P (H1Cut)=0.9

When (3) the SSIM is made in such a state, the values of all the parameters on the model obtained become (N: 1.0).

(4) Fault judgment (a) Function evaluation of machine

N=0.1 from the fuzzy qualitative value of Os, so that N<0.5. Accordingly, the result of the function evaluation is abnormal. Consequently, a fault is diagnosed.

(5) Derivation of fault candidate

The following information are previously stored as fault candidates in the objective model storage portion 15.

H1Cut: H1=0

H1Out: H1=(0, N)

VtOut: Vt=(0, N)

PaperOut: $\zeta$=(0, N )

VbOut: Vb=(N, nil)

TonnerOut: $\gamma$0=(0, N)

MCOut: Vn=(0, N)

Meanwhile, Out means being faulty.

Figure 15:
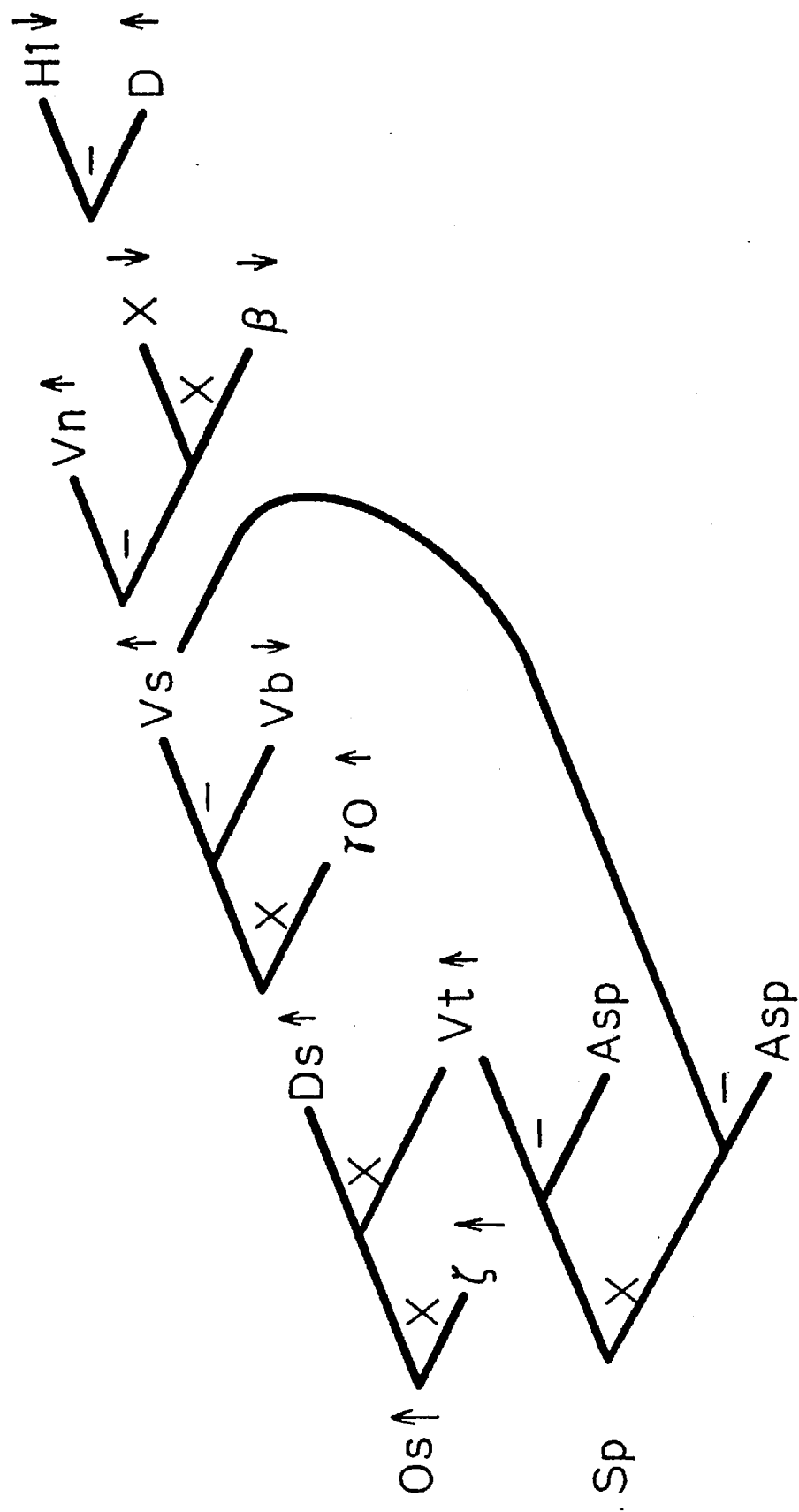
FIG. 15 is a diagram showing a state where the causes of such functional abnormality that Os is large are traced on a parameter model so as to derive a fault candidate.

Such functional abnormality that Os is large, that is, Os=(N, nil) which is found in the foregoing item (4) is traced on the parameter model shown in FIG. 11, to obtain FIG. 15. In FIG. 15, parameters marked with upward arrows are parameters whose value may be changed into (N, nil), parameters marked with downward arrows are parameters whose value may be changed into (0, N) or (0), and parameters marked with no arrows are parameters whose value remains normal. As a result, H1Cut and H1Out out of the above described fault candidates are taken out as fault candidates.

(6) The SSIM is made with respect to the two fault candidates found in the foregoing item (5), to infer the fault state at that time. More specifically, the SSIM is made with respect to H1Out, to obtain the following two types of models:

---
H1 = ((0, N) : 1.0)
D = (N : 1.0)
X = (0 : 1.0) or ((0, N) : 1.0)
β = (N : 1.0)
Vs = ((N, nil) : 1.0)
Yn = (N : 1.0)
Vb = (N : 1.0)
γ0 = (N : 1.0)
Ds = ((N, nil) : 1.0)
Vt = (N : 1.0)
$\zeta$ = (N : 1.0)
Os = ((N, nil) : 1.0)
Asp = (N : 1.0)
Sp = ((N, nil) : 1.0)
---

Two types of models are obtained because X takes two types of values. The reason for this is as follows: The value of X is a value obtained by subtracting D from Hi. However, H1=(0, N) and D=(N) . Accordingly, if "Normal" is subtracted from "Smaller than normal", two types of cases are considered as a results of the fuzzy operation, that is, "Smaller than normal" remains or the answer becomes zero.

Furthermore, the SSIM is made with respect to H1Cut, to obtain the following two types of models:

---
H1 = (0 : 1.0)
D = (N : 1.0)
X = (0 : 1.0) or ((0, N) : 1.0)
β = (N : 1.0)
Vs = ((N, nil) : 1.0)
Yn = (N : 1.0)
Vb = (N : 1.0)
γ0 = (N : 1.0)
Ds = ((N, nil) : 1.0)
Vt = (N : 1.0)
$\zeta$ = (N : 1.0)
Os = ((N, nil) : 1.0)
Asp = (N : 1.0)
Sp = ((N, nil) : 1.0)
---

(7) Specification of causes of fault

The causes of the fault are assigned priority and are narrowed down from the degree of coincidence between the model and the sensor and the degree to which a phenomenon occurs.

(i) Degree of coincidence between model and sensor

| A. H1Out X = 0 | | B. H1Out X = (0, N) | |
|---|---|---|---|
| X | 0.9 | X | 0.1 |
| Vs | 0.9 | Vs | 0.9 |
| Os | 0.9 | Os | 0.9 |
| whole | 0.9 | whole | 0.63 |
| C. H1Cut X = 0 | | D. H1Cut X = (0, N) | |
| X | 0.9 | X | 0.1 |
| Vs | 0.9 | Vs | 0.9 |
| Os | 0.9 | Os | 0.9 |
| Whole | 0.9 | whole | 0.63 |

The degree of coincidence between the model obtained as a result of making the SSIM with respect to each of the fault candidates in the item (6) and the sensor is found as described above.

The model obtained in the item (6) is a parameter model on which the causes of the fault (for example, H1=((0, N): 1.0) for H1Out) are set and the effect of the causes of the fault on the other parameters is traced. Consequently, the higher the degree of coincidence between the value of the sensor paid attention to and the value of a parameter corresponding thereto on the model is, the closer the present state of the objective machine is to the model. In other words, the possibility that the causes of the fault assumed so as to derive the model are the present causes of the fault is high.

In the present embodiment, the degrees of coincidence between the models with respect to H1Out and H1Cut and the sensor are simultaneously 0.9, so that H1Out and H1Cut are both considered as the causes of the fault.

The above described four models are assigned priority as follows:

Priority 1. A, C: 0.9

2. B, D: 0.63

The priority of the causes of the fault may be previously stored in the objective model storage portion 15 shown in FIG. 3 or the like when a plurality of causes are thus derived, to narrow down the causes of the fault in accordance with the priority. In the present embodiment, the following operation is performed so as to further narrow down the causes of the fault.

(ii) Degree to which phenomenon occurs

The causes of the fault are narrowed down by multiplying the value indicating the degree of coincidence by the value indicating the degree to which there occurs a phenomenon which is derived in the stage in which the effect of the amount of degradation obtained in the item (2) is examined, as described below:

p (H1Out)=1

(H1Cut)=0.9

Priority 1. A: 0.9×1.0=0.9 1.0 when normalized

2. C: 0.9×0.9=0.81 0.9 when normalized

9. B: 0.63×1.0=0.63 0.7 when normalized

4. D: 0.63×0.9=0.57 0.63 when normalized

The highest calculated value of (degree of coincidence) ×(degree) is assigned the highest priority. Accordingly, it is found that H1Out is most doubtful. Therefore, such a repair is made as to change the quantity of light of the halogen lamp.

EXAMPLE 3

Example in which machine is degraded n months (nT1) after it starts to be used

The fuzzy qualitative values of the respective parameters are found as follows from the measured values obtained from the sensor:

X=(N: 0.8, (0, N): 0.2)

Vs=(N: 0.9, (N, nil): 0.1)

Os=(N: 0.9, (N, nil): 0.1)

(1) Forecast of the present degraded state

As a result of applying the condition nT1 to FIG.2, following is obtained:

H1=Dn (2) Examination of effect of amount of degradation

The following is obtained by applying the result H1=Dn found in the foregoing item (1) to FIG. 13:

H1=(N: 0.915, (0, N): 0.085)

On the other hand, the result is as follows by applying H1=Dn to FIG. 14:

(H1Cut)=1.24

(3) Inference of present state of entire machine using result of above item (2) by SSIM From the result in the foregoing item (2) and the initial conditions, the following results are obtained:

H1=(N: 0.915, (0, N): 0.085)

D=(N: 1.0)

β(N: 1.0)

Vn=(N: 1.0)

Vb=(N: 1.0)

γ0=(N: 1.0)

Vt=(N: 1.0)

ζ=(N: 1.0)

Asp=(N: 1.0)

The SSIM is made under the conditions, to obtain the following results:

H1 = (N : 0.915, (0, N) : 0.085)
D = (N : 1.0)
X = (N : 0.915, (0, N) : 0.085)
or
(N : 0.915, 0 : 0.085)
β = (N : 1.0)
Vs = (N : 0.915, (N, nil) : 0.085)
Vn = (N : 1.0)
Vb = (N : 1.0)
γ 0 = (N : 1.0)
Ds = (N : 0.915, (N,nil) : 0.085)

-continued

Vt = (N : 1.0)
ζ = (N : 1.0)
Os = (N : 0.915, (N, nil) : 0.085)
Asp = (N : 0.1)
Sp = (N : 0.915, (N, nil) : 0.085)

The results indicate that an image may be high in density as the effect of the degradation of H1 (Os is raised). In addition, the combined effect of the degradation of a plurality of components and consequently, faults serially occurring can be generally inferred from the changes in value of the parameters.

(4) Fault judgment (a) Function evaluation of machine

N=0.9 from the fuzzy qualitative value of Os, so that N≧0.5. Accordingly, the result of the function evaluation is normal.

(b) Comparison between value on model and measured value

Each of the sensor values and the value on the model obtained as the result in the foregoing item (3) are compared with each other, to find the degree of coincidence therebetween.

A. Model of X=(N: 0.915, (0, N): 0.085)

Degree of coincidence between the sensor and the model

| X | : 0.8 |
| Vs | : 0.8 |
| Os | : 0.8 |
| whole | 0.87 |

B. Model of X=(N: 0.915, 0: 0.085)

Degree off coincidence between the sensor and the model

| X | : 0.8 |
| Vs | : 0.9 |
| Os | : 0.9 |
| whole | 0.87 |

Accordingly, it is found that the sensor value possibly coincides with the value on the model A or B. In conclusion, it is judged that the result of the function evaluation of the machine is normal, so that the machine can be normally used, through it is degraded to be brought into the state of the model A or B.

EXAMPLE 4

Case where fault occurs under same conditions as Example 3

The following data are obtained as sensor values:

X=(N: 0.1, (0, N): 0.9)

Vs=((N: nil): 1.0)

Os=((N: nil): 1.0)

Furthermore, the same results as those in the items (1) to (3) in the above described example 3 are obtained by applying values of H1 and T to FIG. 12, FIG. 13 and FIG. 14.

(4) Fault judgment (a) Function evaluation of machine

N=0 from the fuzzy qualitative value of Os, so that N <0.5. Accordingly, the result of the function evaluation is abnormal. Consequently, it is judged that the machine fails.

(5) Derivation of fault candidate

Fault candidates previously stored are the same as those described in the foregoing item (5) in the example 2. Therefore, Os=(N, nil) is traced on the parameter model shown in FIG. 11, to obtain H1Cut and H1Out as fault candidates.

(6) Fault simulation by SSIM

The same results as those in the item (6) in the example 2 are obtained with respect to H1Cut and H1Out.

In the present embodiment, description is made considering that only an exposure portion is degraded for simplification. Accordingly, the results of the fault simulation in this example 4 are the same as those in the example 2. However, the same results are not generally obtained because the values of the other parameters are changed by the effect of the degradation. For example, when ζ=(N: 0.8, (0, N): 0.2) as the effect of the degradation of the output portion, the following results are obtained with respect to H1Out:

```
H1 = ((0, N) : 1.0)
D = (N : 1.0)
X = ((0, N) : 1.0)
or
(0 : 1.0)
β = (N : 1.0)
Vs = ((N, nil) : 1.0)
Vn = (N : 1.0)
Vb = (N : 1.0)
γ0 = (N : 1.0)
Ds = ((N, nil) : 1.0)
Vt = (N : 1.0)
ζ = (N : 0.8, (0, N) : 0.2)
Os = ((0, N) : 0.2, N : 0.2, (N, nil) : 0.8)
((0, N) : 0.18, N : 0.18, (N, nil) : 0.8) when
normalized
Asp = (N : 1.0)
Sp = ((N, nil) : 1.0)
```

(7) Specification of causes of fault

The causes of the fault are assigned priority and are narrowed down from the degree of coincidence between the model and the sensor and the degree to which a phenomenon occurs.

(i) Degree of coincidence between model and sensor

```
A. H1Out X = 0         B. H1Out X = (0, N)
   X      : 0.9           X      : 0.1
   Vs     : 1.0           Vs     : 1.0
   Os     : 1.0           Os     : 1.0
   whole   0.97           whole   0.7
C. H1Cut X = 0         D. H1Cut X = (0, N)
   X      : 0.9           X      : 0.1
   Vs     : 1.0           Vs     : 1.0
   Os     : 1.0           Os     : 1.0
   whole   0.97           whole   0.7
```

Priority 1. A, C: 0.97

2. B, D: 0.7

(ii) Degree to which phenomenon occurs p (H1Out)=1 p (H1Cut)=1.24

Priority 1. C: 0.97×1.24=1.20 1.0 when normalized

2. A: 0.97×1.0=0.97 0.81 when normalized

3. D: 0.7×1.24=0.87 0.73 when normalized

4. B: 0.7×1.0=0.7 0.58 when normalized

Accordingly, C is most doubtful. In addition, at least H1Cut is doubtful. However, H1Cut means that the halogen lamp is cut off and the repair cannot be made, so that the repair is not made.

Meanwhile, it can be judged by dividing the causes of the fault into the causes of the fault which can be repaired and the causes of the fault which cannot be repaired, storing the causes of the fault in the objective model storage portion 15 shown in FIG. 3, and suitably referring to the causes the fault whether the causes of the fault can be repaired. In addition, when the cause of the fault which cannot be repaired is derived as the highest priority one, a message "the repair cannot be made" may be displayed on the display portion.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus provided with a self-diagnosis system, comprising:

objective model storage means for storing data that represent the image forming apparatus as a combination of a plurality of elements, qualitative parameter data that represent, as parameters, attributes of respective elements of the plurality of elements and a combinational relationship between the elements, parameter membership functions corresponding to the parameters, and fault diagnosis knowledge;

degradation data storage means for storing degradation data representing an amount of degradation undergone by at least one component of the image forming apparatus after use of the image forming apparatus has started;

a plurality of sensor means for sensing a functional state of a predetermined portion of the image forming apparatus and outputting state data indicative thereof;

degradation amount calculation means for calculating the degradation of the at least one component from after the image forming apparatus starts to be used to the present time on the basis of degradation data stored in the degradation data storage means;

change calculation means for representing as a fuzzy qualitative value, the value of a changed parameter which has been changed by an amount of degradation calculated by the degradation amount calculation means from among qualitative parameter data stored in the objective model storage means by using the membership function corresponding to the changed parameter;

data conversion means for converting state data outputted by the sensor means into a fuzzy qualitative value by applying parameter membership functions stored in the objective model storage means;

fault judgement means of judging whether or not a fault exists by comparing a fuzzy qualitative value from the data conversion means with qualitative parameter data stored in the objective model storage means; and fault diagnosis means for diagnosing the functional state of the image forming apparatus on the basis of qualitative parameter data and fault diagnosis knowledge stored in the objective model storage means by utilizing as initial conditions a fuzzy qualitative value from the change calculation means in response to a judgement that a fault exists by the fault judgement means, and for outputting a result of the diagnosis as an expression which has ambiguity and which indicates the state of the image forming apparatus.

2. An image forming apparatus according to claim 1, further comprising:

a plurality of actuator means for changing functional states of the image forming apparatus;

cause specification means for specifying fault causes by comparing a fuzzy qualitative value obtained by the data conversion means with the state of the image forming apparatus as outputted by the fault diagnosis means; and repair means for selectively operating the plurality of actuator means so as to remove fault causes specified by the cause specification means.

3. An image forming apparatus according to claim 2, wherein the repair means includes judgement means for judging whether a fault cause specified by the cause specification means is repairable or not repairable; and means for effecting repair only when the judgement means judges that the fault cause is repairable.

4. An image forming apparatus according to claim 1, wherein the objective model storage means further stores a reference value indicative of occurrence of a fault, and the change calculation means calculates a degree of occurrence of a fault in the image forming apparatus based on degradation calculated by the degradation amount calculation means.

5. An image forming apparatus according to claim 4, wherein the cause specification means specifies a fault cause according to the degree of occurrence of a fault as calculated by the change calculation means.

6. An image forming apparatus according to claim 5, wherein the repair means includes judgement means for judging whether a fault cause specified by the cause specification means is repairable or not repairable; and means for effecting repair only when the judgement means judges that the fault cause is repairable.

7. An image forming apparatus provided with a self-diagnosis system, comprising:

objective model storage means for storing data that represent said image forming apparatus as a combination of a plurality of elements, qualitative parameter data that represent, as parameters, attributes of respective elements of the plurality of elements and a combinational relationship between the elements, parameter membership functions corresponding to each of the parameters, and fault diagnosis knowledge;

degradation data storage means for storing a fuzzy qualitative value for a changed parameter changed by degradation estimated for a predetermined fault diagnosis, the changed parameter corresponding to a predetermined one of a plurality of components constituting said image forming apparatus;

a plurality of sensor means for sensing a functional state of a predetermined portion of said image forming apparatus and outputting state data indicative thereof;

data conversion means for converting state data outputted by the sensor means into a fuzzy qualitative value by applying parameter membership functions stored in the objective model storage means during the predetermined fault diagnosis;

fault judgment means for judging whether or not a fault exists by comparing a fuzzy qualitative value from the data conversion means with qualitative data stored in the objective model storage means; and fault diagnosis means for reading out, during fault diagnosis, a fuzzy qualitative value for a parameter from the objective model storage means and diagnosing the functional state of the image forming apparatus on the basis of qualitative data and fault diagnosis knowledge stored in the objective model storage means by utilizing the read out fuzzy qualitative value as an initial condition in response to a judgement that a fault exists by the fault judgement means, and for outputting a fault diagnosis result as an expression having ambiguity.

8. An image forming apparatus according to claim 7, further comprising:

a plurality of actuator means capable of changing functional states of said image forming apparatus;

cause specification means for specifying fault causes by comparing a fuzzy qualitative value obtained by the data conversion means with a state of said image forming apparatus as outputted by the fault diagnosis means; and repair means for selectively operating the plurality of actuator means so as to remove fault causes specified by the cause specification means.

9. An image forming apparatus provided with a self-diagnosis and self-repair system, comprising:

objective model storage means for storing data that represent the image forming apparatus as a combination of a plurality of elements, qualitative parameter data that represent, as parameters, attributes of respective elements of the plurality of elements and a combinational relationship between the elements, parameter membership functions corresponding to each of the parameters, and fault diagnosis knowledge;

degradation data storage means for storing a fuzzy qualitative value for a changed parameter changed by an estimated amount of degradation for a predetermined fault diagnosis and a degree to which a fault phenomenon occurs in the image forming apparatus by the estimated amount of degradation, corresponding to a predetermined one of a plurality of components constituting said image forming apparatus;

a plurality of sensor means for sensing a functional state of a predetermined portion of said image forming apparatus and outputting state data indicative thereof;

a plurality of actuator means capable of changing functional states of said image forming apparatus;

data conversion means for converting state data outputted by the sensor means into a fuzzy qualitative value by applying parameter membership functions stored in the objective model storage means during the predetermined fault diagnosis;

fault judgment means for judging whether or not a fault exists by comparing a fuzzy qualitative value from the data conversion means with qualitative data stored in the objective model storage means;

fault diagnosis means for reading out, during a fault diagnosis, a fuzzy qualitative value for a parameter from the objective model storage means and diagnosing the state of said image forming apparatus on the basis of qualitative data and fault diagnosis knowledge stored in the objective model storage means by utilizing the read out fuzzy qualitative value as an initial condition in response to a judgement that a fault exists by the fault judgment means, and for outputting a fault diagnosis result as an expression having ambiguity;

cause specification means for specifying fault causes by comparing a fuzzy qualitative value obtained by the data conversion means with the state of said image forming apparatus as outputted by the fault diagnosis means; and repair means for selectively operating the plurality of actuator means so as to remove fault causes specified by the cause specification means.

* * * * *